US012337602B2

(12) United States Patent
Hayashi et al.

(10) Patent No.: US 12,337,602 B2
(45) Date of Patent: *Jun. 24, 2025

(54) PRINTING DEVICE INCLUDING CONTROLLER PROVIDED WITH MANUAL MAINTENANCE MODE AND AUTOMATED MAINTENANCE MODE AS CONTROL MODE FOR CONTROLLING MAINTENANCE PORTION

(71) Applicant: BROTHER KOGYO KABUSHIKI KAISHA, Nagoya (JP)

(72) Inventors: Masahiro Hayashi, Nishio (JP); Sadaaki Miyazaki, Nagoyo (JP); Tomohiro Nodsu, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 126 days.

This patent is subject to a terminal disclaimer.

(21) Appl. No.: 18/301,287

(22) Filed: Apr. 17, 2023

(65) Prior Publication Data

US 2023/0249465 A1 Aug. 10, 2023

Related U.S. Application Data

(63) Continuation of application No. 17/354,239, filed on Jun. 22, 2021, now Pat. No. 11,628,672.

(30) Foreign Application Priority Data

Jun. 26, 2020 (JP) .................... 2020-110830

(51) Int. Cl.
*B41J 2/165* (2006.01)
*G06F 3/12* (2006.01)

(52) U.S. Cl.
CPC ........ *B41J 2/16517* (2013.01); *G06F 3/1204* (2013.01); *G06F 3/121* (2013.01);
(Continued)

(58) Field of Classification Search
CPC ................ B41J 2/165; B41J 2002/1657; B41J 2/16517; B41J 2002/16573;
(Continued)

(56) References Cited

U.S. PATENT DOCUMENTS 11,628,672 B2 * 4/2023 Hayashi ............... B41J 2/16532
347/9

FOREIGN PATENT DOCUMENTS

JP 2018-012339 A 1/2018
KR 20210132850 A 11/2021

OTHER PUBLICATIONS

Notice of Allowance dated Dec. 14, 2022 from parent application U.S. Appl. No. 17/354,239.

* cited by examiner

*Primary Examiner* — Justin Seo
(74) *Attorney, Agent, or Firm* — Scully, Scott, Murphy & Presser, PC (57) ABSTRACT

A printing device includes a printing portion, a maintenance portion, and a controller. The printing portion includes an ejection head and prints using ink. The maintenance portion performs maintenance on the ejection head. The maintenance involves consumption of ink. The controller has a manual maintenance mode and an automated maintenance mode. In the manual maintenance mode, the controller executes a maintenance using the maintenance portion in response to a maintenance command signal based on a manual operation. In the automated maintenance mode, the controller automatically executes a maintenance using the maintenance portion in response to a maintenance execution condition being met. Based on control information acquired, the controller switches an operating mode of the printing device from a first operating mode of selectively executing the manual maintenance mode and the automated mainte- (Continued)

nance mode to a second operation mode of executing the automated maintenance mode without executing the manual maintenance mode.

8 Claims, 5 Drawing Sheets

(52) U.S. Cl.
CPC ... *G06F 3/1229* (2013.01); *B41J 2002/16573* (2013.01); *B41J 2002/16582* (2013.01)

(58) Field of Classification Search
CPC .......... B41J 2002/16582; G06F 3/1204; G06F 3/121; G06F 3/1229
See application file for complete search history.

PRINTING DEVICE INCLUDING CONTROLLER PROVIDED WITH MANUAL MAINTENANCE MODE AND AUTOMATED MAINTENANCE MODE AS CONTROL MODE FOR CONTROLLING MAINTENANCE PORTION

REFERENCE TO RELATED APPLICATIONS

This application is a continuation of U.S. patent application Ser. No. 17/354,239, filed Jun. 22, 2021, which claims priority from Japanese Patent Application No. 2020-110830 filed Jun. 26, 2020. The entire contents of the aforementioned applications are incorporated herein by reference.

BACKGROUND ART

Technical Field

The present disclosure relates to a printing device with a maintenance function for maintaining an ejection head.

Background

Conventional printing devices have been provided with a function for executing maintenance operations. For example, Japanese Patent Application Publication No. 2018-12339 describes a printing device provided with an automatic maintenance function for automatically performing maintenance when prescribed conditions are met, and a manual maintenance function for executing maintenance in response to a command from the user of the printing device.

DESCRIPTION

Summary

Under a retail business model, the user purchases a printing device to use for printing, as well as the cartridges that are mounted in the printing device. In this case, the ink accommodated in the ink cartridge is the property of the user. Therefore, there is no problem even when the user executing maintenance manually on the user's own will and ink in the ink cartridges is thus consumed in maintenance operations. Therefore, the user can perform maintenance at a desired timing, and can thus obtain a high degree of convenience.

However, in recent years users may enter a subscription agreement to use a printing device with a service provider that owns the printing device. The user pays the service provider a fee based on printing content. Under this subscription business model, the ink accommodated in ink cartridges mounted in the printing device is essentially the property of the service provider. Consequently, if the user were allowed to execute manual maintenance as desired, the service provider could suffer a loss from ink being consumed in the ink cartridges.

The conventional printing device described in the aforementioned Publication does not give any particular consideration to the above issue. Consequently, the service provider may be disadvantaged if the user executes manual maintenance under the subscription business format, thereby reducing convenience for the service provider.

In view of the foregoing, it is an object of the present disclosure to provide a printing device that ensures convenience for both the user and the service provider by modifying control according to the business model in use.

In order to attain the above and other objects, according one aspect, the present disclosure provides a printing device including a mounting portion, a printing portion, a maintenance portion, and a controller. An accommodation body accommodating therein ink is detachably mountable in the mounting portion. The printing portion includes an ejection head configured to eject ink supplied from the accommodation body. The printing portion is configured to print on a printing medium using ink. The maintenance portion is configured to perform maintenance on the ejection head. The maintenance involves consumption of ink. The controller is provided with a manual maintenance mode and an automated maintenance mode as a control mode for controlling the maintenance portion. In the manual maintenance mode, the controller executes the maintenance by controlling the maintenance portion in response to acquiring a maintenance command signal based on a manual operation. In the automated maintenance mode, the controller automatically executes the maintenance by controlling the maintenance portion in response to a prescribed maintenance execution condition being met. The controller is configured to perform (a) switching, on the basis of control information acquired by the controller, an operating mode of the printing device from a first operating mode in which the controller selectively executes the manual maintenance mode and the automated maintenance mode to a second operation mode in which the controller executes the automated maintenance mode without executing the manual maintenance mode.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Next, a printing device according to one embodiment of the present disclosure will be described while referring to the accompanying drawings. The printing device according to the present embodiment can be used under both a retail business model and a subscription business model. Under the retail business model, the user purchases the printing device and ink cartridges to be mounted and used in the printing device. Under the subscription business model, the user pays a fee to a service provider that owns the printing device. Hereinafter, a printer 1 as an example of the printing device according to the present embodiment will be described.

<Overall Structure of the Printer>

Figure 1:
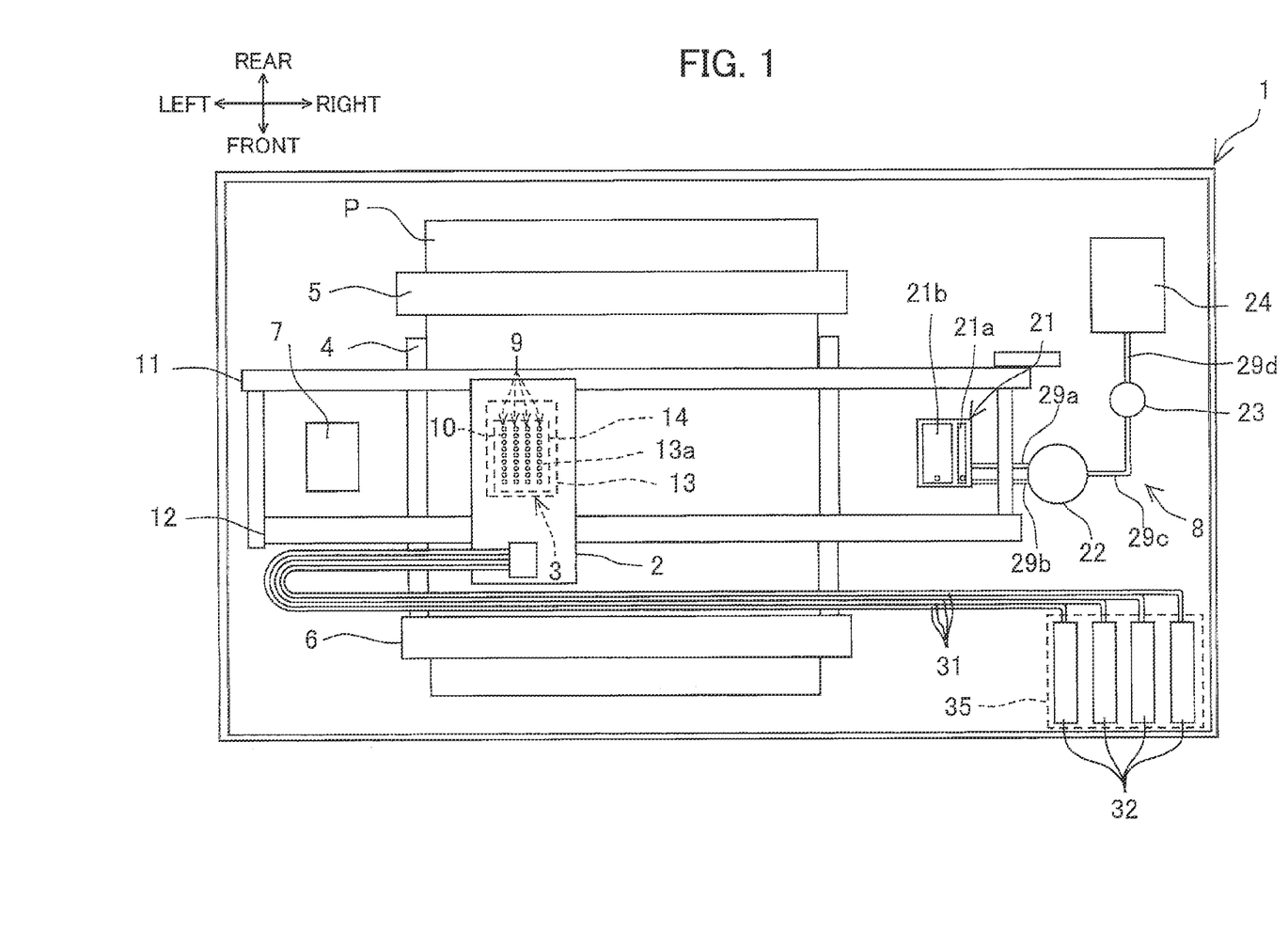
FIG. 1 is a schematic view of a printer according to one embodiment of the present disclosure.
Figure 2:
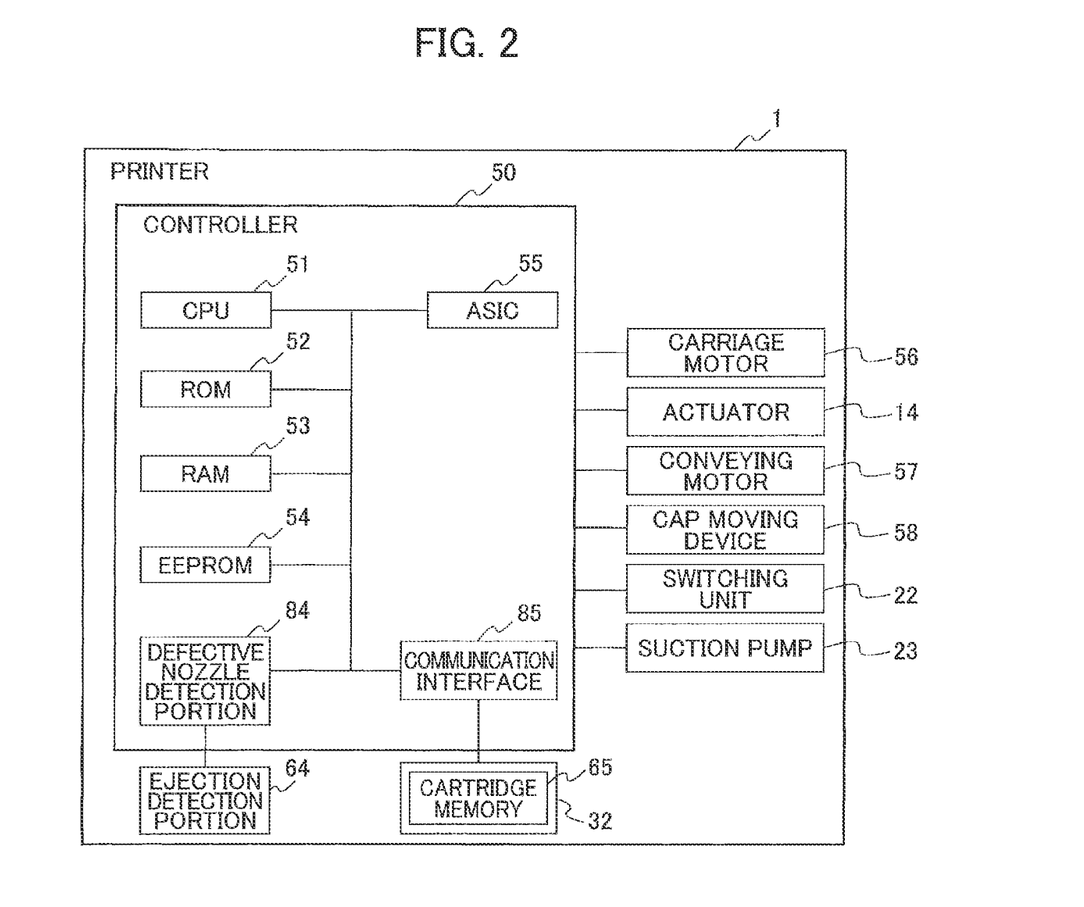
FIG. 2 is a functional block diagram of the electrical structure of the printer.

FIGS. 1 and 2 illustrate the printer 1 that is used by the user described above. The printer 1 is owned by a service provider that provides a printing service, for example. As shown in FIG. 1, the printer 1 according to the present embodiment includes a carriage 2, an inkjet head 3, a platen 4, conveying rollers 5 and 6, a flushing foam 7, a purge unit 8, and the like. The side on which the purge unit 8 is provided will be the right side of the printer 1, and the side on which the flushing foam 7 is provided will be the left side of the printer 1. The side on which the conveying roller 6 is provided will be the front side of the printer 1, and the side on which the conveying roller 5 is provided will be the rear side of the printer 1. The left-right direction is also the scanning direction, and the direction from the rear side toward the front side is the conveying direction. The carriage 2 and the inkjet head 3 are an example of the printing portion. Also, the inkjet head 3 is an example of the ejection head. The flushing foam 7 and the purge unit 8 are an example of the maintenance portion.

The carriage 2 is connected to a carriage motor 56 (described later with reference to FIG. 2) by a belt and the like (not shown). When driven by the carriage motor 56, the carriage 2 moves in the scanning direction along guide rails 11 and 12.

The inkjet head 3 is mounted in the carriage 2. The inkjet head 3 includes a channel unit 13, and an actuator 14.

The bottom surface of the channel unit 13 constitutes a nozzle surface 13a. A plurality of nozzles 10 is formed in the nozzle surface 13a. Ink channels that include the nozzles 10 are formed in the channel unit 13. The nozzles 10 form four nozzle rows 9 each of which extends in the conveying direction orthogonal to the scanning direction. The nozzles 10 in each nozzle row 9 are arranged in the conveying direction orthogonal to the scanning direction. That is, in the nozzle surface 13a, the four nozzle rows 9 are juxtaposed in the scanning direction. The nozzles 10 in each nozzle row 9 eject ink in the respective colors black, yellow, cyan, and magenta in order from the right side to the left side, for example.

The actuator 14 includes a plurality of electrodes, for example. By applying a drive pulse signal to each electrode, the actuator 14 functions to apply ejection energy to ink in each individual nozzle 10.

The inkjet head 3 is connected to four tubes 31. The four tubes 31 are respectively connected to four ink cartridges 32. The four ink cartridges 32 are provided in the right-front corner of the printer 1 and are juxtaposed in the scanning direction. Ink in the colors black, yellow, cyan, and magenta stored respectively in the four ink cartridges 32 is supplied to the inkjet head 3 via the tubes 31. Each of the four ink cartridges 32 is detachably mounted in a cartridge holder 35. The ink cartridge 32 is an example of the accommodation body. The cartridge holder 35 is an example of the mounting portion.

The platen 4 is positioned beneath the inkjet head 3 and faces the nozzle surface 13a during printing. When a recording sheet P is conveyed through the printer 1, the platen 4 supports the recording sheet P from below. The platen 4 extends across the entire width of the recording sheet P in the scanning direction. The conveying rollers 5 and 6 are respectively positioned on the upstream side and downstream side of the platen 4 in the conveying direction. The conveying rollers 5 and 6 are connected to a conveying motor 57 (described later with reference to FIG. 2) through gears and the like (not shown). When driven by the conveying motor 57, the conveying rollers 5 and 6 rotate to convey a recording sheet P in the conveying direction. The recording sheet P is an example of the printing medium.

The printer 1 having the above construction can print on recording sheets P. Specifically, the printer 1 sequentially conveys the recording sheet P a prescribed distance at a time using the conveying rollers 5 and 6 and, after each conveyance, moves the carriage 2 along the scanning direction while ejecting ink from the nozzles 10 formed in the inkjet head 3.

<Flushing Foam>

The flushing foam 7 is configured of a sponge or other material capable of absorbing ink. The flushing foam 7 is positioned on the left side of the platen 4. Under the control of a controller 50 described later, the printer 1 can move the carriage 2 to a flushing position in which the nozzle surface 13a faces the flushing foam 7. At this time, the printer 1 can execute a flush operation described later.

<Purge Unit>

The purge unit 8 includes a cap 21, a switching unit 22, a suction pump 23, and a waste liquid tank 24.

The cap 21 is positioned to the right of the platen 4. The printer 1 can move the carriage 2 to a maintenance position in which the nozzle surface 13a faces the cap 21. The cap 21 includes a capping part 21a, and a capping part 21b adjacent to the left side of the capping part 21a. When the carriage 2 is in the maintenance position, the nozzles 10 forming the rightmost nozzle row 9 face the capping part 21a, while the nozzles 10 forming the other three nozzle rows 9 on the left side of the rightmost nozzle row 9 face the capping part 21b.

The cap 21 can be raised and lowered by a cap moving device 58 (described later with reference to FIG. 2). That is, the cap moving device 58 can move the cap 21 in an intersecting direction that intersects the nozzle surface 13a. When the cap 21 is raised while the carriage 2 is in the maintenance position, the cap 21 becomes tightly fitted over the nozzle surface 13a to cover the plurality of nozzles 10. More specifically, the nozzles 10 forming the rightmost nozzle row 9 are covered by the capping part 21a while the nozzles 10 forming the other three nozzle rows 9 on the left side are covered by the capping part 21b. Hereinafter, this state will be referred also to "capping state". Thus, the cap moving device 58 can raise and lower the cap 21 between a capping position for bringing the printer 1 into the capping state, and an uncapping position below the capping position.

The cap 21 is not limited to a construction that covers the nozzles 10 by becoming tightly fitted over the nozzle surface 13a. For example, if the channel unit 13 has a frame arranged around the nozzle surface 13a for protecting the nozzles 10, the cap 21 may be configured to cover the nozzles 10 by becoming closely fitted over this frame.

The switching unit 22 is connected to the capping parts 21a and 21b through respective tubes 29a and 29b. The switching unit 22 is also connected to the suction pump 23 through a tube 29c. The switching unit 22 selectively connects one of the capping parts 21a and 21b to the suction pump 23. That is, the switching unit 22 switches a connection state of the suction pump 23 with the capping parts 21a and 21b between a connection state in which the suction pump 23 is connected to the capping part 21a and a connection state in which the suction pump 23 is connected to the capping part 21b. The suction pump 23 is a tube pump, for example. The suction pump 23 is connected to the waste liquid tank 24 via a tube 29d positioned on the opposite side of the suction pump 23 from the switching unit 22.

<Electrical Structure of the Printer>

Next, the electrical structure of the printer 1 will be described with reference to FIG. 2. Operations of the printer 1 are controlled by a controller 50.

The controller 50 includes a CPU 51, a ROM 52 for storing control programs and the like for the printer 1, a RAM 53 for temporarily storing process data and the like, a EEPROM 54 for storing data and the like that must be preserved even when the power is turned off, and an application-specific integrated circuit (ASIC) 55. With this configuration, the controller 50 controls a carriage motor 56, the actuator 14, a conveying motor 57, a cap moving device 58, the switching unit 22, the suction pump 23, and the like. The EEPROM 54 is an example of the memory.

The controller 50 also includes a defective nozzle detection portion 84, and a communication interface 85. The defective nozzle detection portion 84 detects the ink ejection states of nozzles 10 formed in the inkjet head 3 to determine whether the nozzles 10 are clogged or otherwise defective.

The defective nozzle detection portion 84 is connected to an ejection detection portion 64. The ejection detection portion 64 is disposed in a position where the ejection detection portion 64 can face the inkjet head 3. The ejection detection portion 64 includes an ink absorbent material and a conductive material that is electrically connected to the ink absorbent material, for example. The defective nozzle detection portion 84 is configured to detect electric signals flowing in the conductive material. The defective nozzle detection portion 84 ejects charged ink droplets from each nozzle 10 in the inkjet head 3 and detects signals indicating changes in electric current produced when the charged ink droplets land on the absorbent material. When the signal value is less than or equal to a prescribed threshold, the defective nozzle detection portion 84 detects an ejection failure for that nozzle 10, i.e., detects that the quantity of ink ejected from the nozzle 10 is less than the prescribed ejection quantity or the nozzle 10 did not eject ink. That is, the defective nozzle detection portion 84 is configured to detect whether the nozzles 10 of the inkjet head 3 have ink ejection failures.

Note that the method for detecting an ejection failure in the nozzles 10 is not limited to that described above using the defective nozzle detection portion 84. For example, the controller 50 may control the carriage motor 56, the conveying rollers 5 and 6, and the inkjet head 3 to print a suitable test pattern. Then the test pattern may be scanned with a CCD, photosensor, or the like to detect which nozzles 10 have ejection failures.

The communication interface 85 communicates with the four ink cartridges 32 mounted in the cartridge holder 35 according to a suitable method. As described above, the printer 1 according to the present embodiment is used under both a retail business model and a subscription business model. For this reason, each ink cartridge 32 is provided with a cartridge memory 65 that stores cartridge type information indicating whether the ink cartridge 32 is a retail cartridge (i.e., the ink cartridge 32 for the retail business model) or a subscription-based cartridge (i.e., the ink cartridge 32 for the subscription business model). By communicating with the cartridge memory 65 provided on each ink cartridge 32, the communication interface 85 can acquire this cartridge type information.

Note that retail ink cartridges 32 are ink cartridges that are subject to purchase by the users themselves, while subscription ink cartridges 32 are ink cartridges that are not subject to purchase by users themselves. The retail ink cartridge 32 is an example of the first accommodation body. The cartridge memory 65 of the retail ink cartridge 32 is an example of the first memory. The cartridge type information stored in the cartridge memory 65 of the retail ink cartridge 32 is an example of the first type information. The subscription ink cartridge 32 is an example of the second accommodation body. The cartridge memory 65 of the subscription ink cartridge 32 is an example of the second memory. The cartridge type information stored in the cartridge memory 65 of the subscription ink cartridge 32 is an example of the second type information.

While the configuration in FIG. 2 shows a single CPU 51, the controller 50 may include a plurality of CPUs 51 that share the processing load. Similarly, while a single ASIC 55 is shown in FIG. 2, the controller 50 may include a plurality of ASICs 55 that share the processing load. Further, in order to avoid complicating FIG. 2, only one of the four cartridge memories 32 is shown in FIG. 2 and the remaining three cartridge memories 32 are omitted.

<Flush Operation>

Next, a flush operation executed as an example of the above-mentioned maintenance will be described. Specifically, the printer 1 under control of the controller 50 performs a flush operation of discharging thickened ink from the plurality of nozzles 10 by driving the actuator 14 in a state where the carriage 2 is in the flushing position. The details are as follows.

Specifically, moisture evaporates from ink in the nozzles 10 when the printer 1 is in a standby state. However, in the present embodiment, since the printer 1 is brought into the capping state when the printer 1 is in the standby state, the printer 1 can suppress an increase in the evaporation rate of ink in the nozzles 10. To execute a printing operation, the controller 50 first controls the cap moving device 58 to lower the cap 21, and then controls the carriage motor 56 to move the carriage 2 to the flushing position. In this state, the controller 50 controls the actuator 14 to execute a pre-printing flush operation. After completing the pre-printing flush operation, the controller 50 performs a printing operation by controlling the carriage motor 56 to move the carriage 2 along the scanning direction within a positional range in which the nozzle surface 13a faces the recording sheet P, while controlling the actuator 14 to eject ink from the nozzles 10. After completing the printing operation, the controller 50 controls the carriage motor 56 to move the carriage 2 to the maintenance position and controls the cap moving device 58 to raise the cap 21, returning the printer 1 to the capping state.

<Purge Operation>

Next, a purge operation executed by the purge unit 8 as another example of the above-mentioned maintenance will be described.

In the capping state, the printer 1 under control of the controller 50 connects the suction pump 23 to the capping part 21a through the switching unit 22 and drives the suction pump 23 to perform a suction purge for black ink. By this operation, black ink in the channel unit 13 is discharged from the plurality of nozzles 10 formed in the rightmost nozzle row 9.

Similarly, in the capping state, the printer 1 under control of the controller 50 connects the suction pump 23 to the capping part 21b through the switching unit 22 and drives the suction pump 23 to perform a suction purge for color ink. By this operation, the yellow, cyan, and magenta ink in the channel unit 13 are discharged from the plurality of nozzles 10 formed in the three nozzle rows 9 on the left side of the rightmost nozzle row 9.

Ink discharged through suction purges is collected in the waste liquid tank 24. The purge and flush operations described above are examples of maintenance performed in the present embodiment that involves the consumption of ink. Other types of maintenance may also be applicable provided that ink is being consumed.

<Execution of Maintenance>

In the present embodiment, the controller 50 of the printer 1 is provided with two control modes related to maintenance: a manual maintenance mode and an automated maintenance mode.

In the manual maintenance mode, the above-described maintenance is executed in response to acquiring a maintenance command signal based on a manual operation performed by the user or other person. In the automated maintenance mode, the above-described maintenance is executed automatically in response to a prescribed maintenance execution condition being met. In this example, the degree of thickening of ink in the nozzles 10 is determined according to a suitable method at predetermined time intervals, such as semimonthly, and if maintenance is determined to be necessary, maintenance that includes at least one of the above-described flush operation and the above-described purge operation is executed.

<Maintenance>

Figure 3:
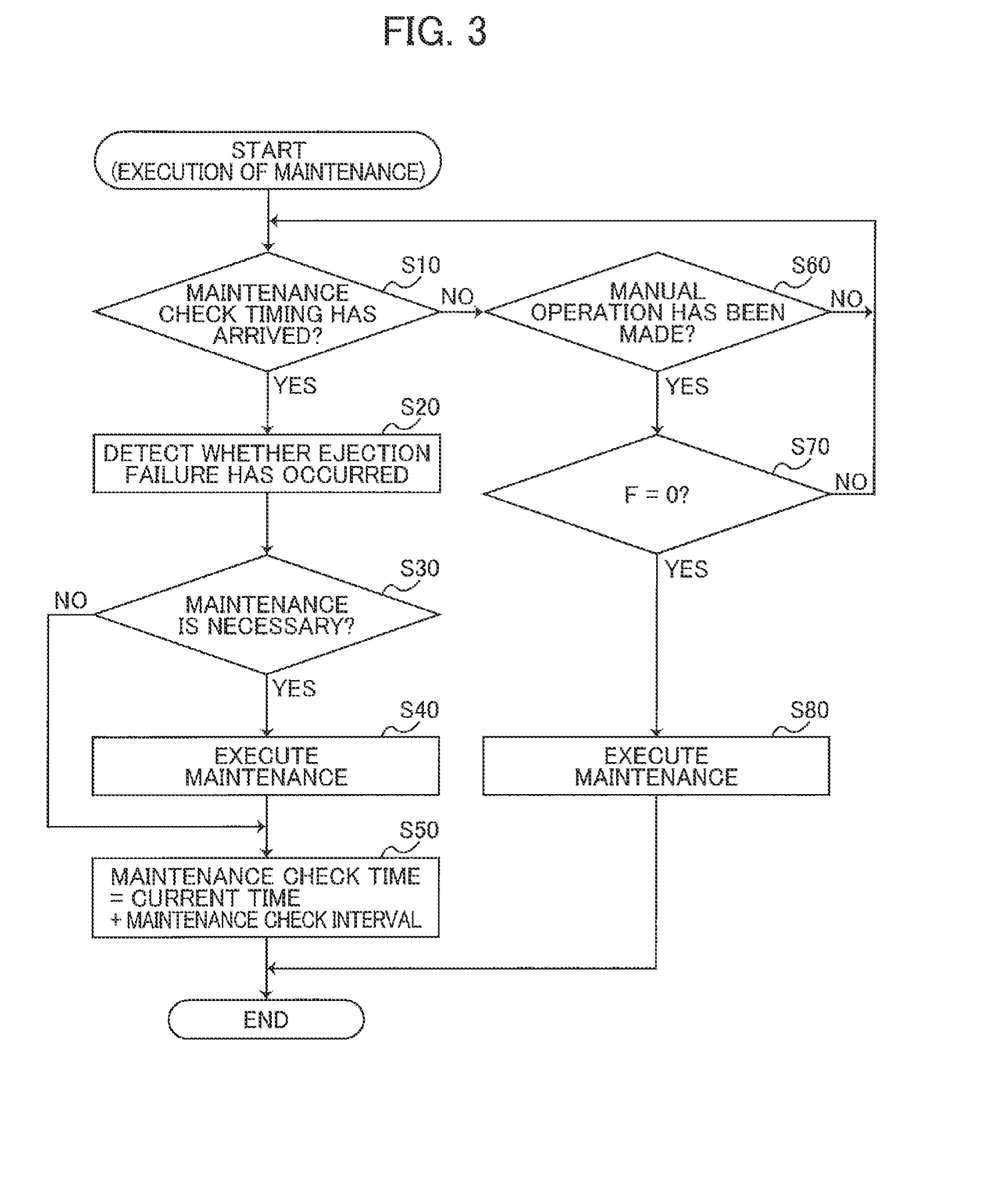
FIG. 3 is a flowchart indicating a process performed by a CPU of the printer to execute maintenance.

In order to perform maintenance in the manual maintenance mode or automated maintenance mode described above, the CPU 51 executes a control process described in the flowchart of FIG. 3. This control process is performed according to a maintenance process program included in the plurality of programs stored in the ROM 52. Execution of this process implements the following maintenance method according to the present embodiment.

In S10 at the beginning of the maintenance process, the CPU 51 determines whether a predetermined maintenance check timing has arrived. If the check timing has arrived (S10: YES), in S20 the defective nozzle detection portion 84 performs a detection process to detect via the ejection detection portion 64 whether there is an ejection failure in any of the nozzles 10.

In S30 the CPU 51 determines whether the maintenance operation described above is necessary, i.e., whether an ejection failure has occurred in any of the nozzles 10. If the CPU 51 determines that a maintenance operation is required (S30: YES), in S40 the CPU 51 executes a maintenance operation including at least one of the purge operation with the purge unit 8 and the flush operation on the flushing foam 7. Subsequently, the CPU 51 advances to S50 described later.

However, if the CPU 51 determines in S30 that a maintenance operation is not necessary, i.e., when there is no ejection failure in any of the nozzles 10 (S30: NO), the CPU 51 advances directly to S50.

In S50 the CPU 51 sets a new maintenance check time by adding a predetermined maintenance check interval to the current time, and subsequently ends the maintenance process. Here, the maintenance check interval is a predetermined period such as a half month.

The process from S20 to S50 executed when a "YES" determination is made in S10 corresponds to an example of the automated maintenance mode described above.

However, if the CPU 51 determines in S10 that the maintenance check timing has not arrived (S10: NO), in S60 the CPU 51 determines whether the user or another person has performed a manual operation, and specifically whether a maintenance command signal has been inputted through a manual operation. If the CPU 51 determines that no manual operation has been performed (S60: NO), the CPU 51 returns to S10. However, if a manual operation has been performed (S60: YES), the CPU 51 advances to S70.

In S70 the CPU 51 determines whether a subscription flag F is set to 0. The subscription flag F indicates whether the ink cartridges 32 are subscription-based ink cartridges 32. If the subscription flag F is set to 1, i.e., indicates that the ink cartridges 32 mounted in the cartridge holder 35 at the time of the determination of S70 are subscription-based ink cartridges 32 (S70: NO), the CPU 51 returns to S10. However, if the subscription flag F is set to 0, i.e., indicates that the ink cartridges 32 mounted in the cartridge holder 35 at the time of the determination of S70 are retail ink cartridges 32 (S70: YES), the CPU 51 advances to S80.

In S80, as in S40 described above, the CPU 51 executes a maintenance operation including at least one of the purge operation performed with the purge unit 8 and the flush operation performed on the flushing foam 7. Subsequently, the CPU 51 ends the maintenance process. The process of S80 executed when a "YES" determination is made both in S60 and S70 corresponds to an example of the manual maintenance mode described above.

<Switching of Operating Mode>

The most significant feature of the present embodiment is that the operating mode related to the manual maintenance mode and the automated maintenance mode is switched depending on whether the mounted ink cartridges 32 are retail or subscription-based cartridges. That is, the operating mode of the printer 1 can be switched between a first operating mode in which the printer 1 can selectively execute the manual maintenance mode and the automated maintenance mode, and a second operating mode in which the printer 1 can only execute the automated maintenance mode without executing the manual maintenance mode.

Next, a control process executed by the CPU 51 to switch the operating mode will be described with reference to the flowchart in FIG. 4. As with the flowchart in FIG. 3, the CPU 51 executes this control process according to a switching process program included in the plurality of programs stored in the ROM 52. Execution of this program implements the following switching method according to the present embodiment.

In S110 at the beginning of the switching process, the CPU 51 determines whether ink cartridges 32 have been newly mounted in the cartridge holder 35 based on a suitable method known in the art or based on the results of communication with the cartridge memories 65 described above. When ink cartridges 32 have been newly mounted (S110: YES), the CPU 51 advances to S120.

In S120 the CPU 51 sets the subscription flag F described above to 0 so that the subscription flag F will indicates that the mounted ink cartridges 32 are retail cartridges and not subscription-based cartridges. When F=0, as described in the process of FIG. 3, the CPU 51 executes the automated maintenance mode (automated maintenance) in S20-S40 when determining in S10 that the maintenance timing has arrived (S10: YES) and executes the manual maintenance mode (maintenance based on a manual operation) in S80 when a manual operation is performed at any other timing. Hence, in a state where F=0, the operating mode is set to the first operating mode in which the printer 1 selectively executes the manual maintenance mode and the automated maintenance mode.

In S130 the CPU 51 acquires type information from the cartridge memories 65 of the ink cartridges 32 through communication via the communication interface 85. As described above, the type information indicates whether the ink cartridges 32 are subscription-based or retail cartridges.

In S140 the CPU 51 determines whether the ink cartridges 32 are a prescribed type based on the type information acquired in S130. In this example, the CPU 51 determines whether the ink cartridges 32 are subscription-based cartridges. The CPU 51 advances to S150 if the type information acquired in S130 indicates that the ink cartridges 32 are retail cartridges and not subscription-based cartridges (S140: NO).

In S150 the CPU 51 sets the subscription flag F to the value 0. In other words, if the subscription flag F is already 0 at this time, the CPU 51 leaves the subscription flag F unchanged. If the subscription flag F is 1 at this time, the CPU 51 changes the value of the subscription flag F from 1 to 0. Subsequently, the CPU 51 advances to S190 described later.

However, if the CPU 51 determines in S140 that the type information acquired in S130 indicates that the ink cartridges 32 are subscription-based cartridges (S140: YES), the CPU 51 advances to S160.

In S160 the CPU 51 determines whether contract information for the subscription business is stored in the EEPROM 54 since the ink cartridges 32 are determined to be subscription-based cartridges in S140. The contract information is information indicating contract details of an agreement that the user enters into in advance for use of the printer 1 and subscription-based ink cartridges 32. Here, in a case where the printer 1 is used under a subscription business model, typically, the user of the printer 1 enters into an agreement in advance with the service provider that owns the printer 1 with regard to the payment method and other details. In the present embodiment, contract details of such an agreement entered into in advance is stored in the EEPROM 54. Thus, the CPU 51 makes the determination in S160 based on such contents stored in the EEPROM 54.

If the CPU 51 determines that contract information for the user's use is not stored in the EEPROM 54 (S160: NO), the CPU 51 advances to S150 described above. However, if contract information for the user's use is stored in the EEPROM 54 (S160: YES), the CPU 51 advances to S170.

In S170 the CPU 51 sets the subscription flag F to 1. That is, if the subscription flag F is 0 at this time, the CPU 51 changes the value for the subscription flag F from 0 to 1, and if the subscription flag F is already 1 at this time, the CPU 52 leaves the subscription flag F unchanged at 1. In a state where the subscription flag F is 1, the CPU 51 executes the automated maintenance mode in S20-S40 described in the process of FIG. 3 when determining that the maintenance timing has arrived (S10: YES) and does not execute the manual maintenance mode at any timing, even if a manual operation is performed (S70: NO). Thus, in S170 the CPU 51 switches the operating mode of the printer 1 from the first operating mode to the second operating mode in which the printer 1 can execute the automated maintenance mode without executing the manual maintenance mode. Subsequently, the CPU 51 advances to S180.

After switching to the second operating mode in S170 described above for executing only automated maintenance (the automated maintenance mode), in S180 the CPU 51 determines whether an exception condition has been met. The exception condition is provided in order to allow the manual maintenance mode (maintenance based on a manual operation) to be executed in exceptional cases. That is, when the exception condition is met, execution of the manual maintenance mode is exceptionally allowed. In the present embodiment, the following three cases are considered possible examples of the exception condition.

(i) Remote Manual Operation Performed by the Service Provider

An example exception condition is that a remote manual operation to execute maintenance is performed by the service provider that owns the printer 1. That is, when a remote manual operation to execute maintenance is performed by the service provider that owns the printer 1, the CPU 52 determines that an exception condition is met in S180.

There is a case in which interfaces for accessing the printer 1 via a network are clearly distinguished between an interface for a user and a dedicated interface for the service provider, for example. In this case, when the service provider performs a remote manual operation to execute maintenance via this dedicated interface, the CPU 51 of the printer 1 recognizes this access as an exception case (i.e., determines that an exception condition is met) condition and can enter the manual maintenance mode (i.e., can execute manual maintenance) in response to this remote manual operation, as will be described later.

(ii) User Manual Operation Allowed by the Service Provider

Another example exception condition is that a user manual operation allowed by the service provider that owns the printer 1 is performed. That is, when a user manual operation allowed by the service provider that owns the printer 1 is performed, the CPU 52 determines that an exception condition is met in S180.

There is a case in which the user is allowed by the service provider to perform a manual operation to execute maintenance only during nighttime or other times outside of business hours when the service provider is unavailable, and such a manual operation is permitted during specified time slots and for a limited number of times. Further, this manual operation may be allowed. In this case, the service provider performs a suitable setting for such allowances through the dedicated interface described above. Accordingly, if the user performs a manual operation to execute maintenance during a given time slot and the number of manual operations executed by the user is within the specified number, the CPU 51 of the printer 1 recognizes the user's manual operation as an exception case (i.e., determines that an exception condition is met) and can enter the manual maintenance mode (i.e., can execute manual maintenance) in response to this user manual operation, as will be described later.

(iii) Direct Manual Operation Performed by the Service Provider

The other example exception condition is that a direct manual operation to switch the operating mode of the printer 1 to the first operating mode is performed on the printer 1 by the service provider that owns the printer 1. That is, when a direct manual operation to switch the operating mode of the printer 1 to the first operating mode is performed on the printer 1 by the service provider that owns the printer 1, the CPU 52 determines that an exception condition is met in S180.

There is a case in which the service provider directly performs a predetermined manual operation on the printer 1 to switch the operating mode of the printer 1 to the first operating mode described above. The manual operation may be a suitable key operation or entry of a hidden code, for example. In this case, when such an operation is performed, the CPU 51 of the printer 1 recognizes this operation as an exception case (i.e., determines that an exception condition is met) and can enter the manual maintenance mode (i.e., can execute manual maintenance) based on this manual operation, as will be described later.

If one of the exception conditions described above has been met (S180: YES), the CPU 51 advances to S150 described above and switches the subscription flag F from the value 1 to the value 0. In this way, when the flow proceeds from S180 to S150, the operating mode of the printer 1 is switched from the second operating mode in which only the automated maintenance mode can be executed to a third operating mode in which the manual maintenance mode and automated maintenance mode can be selectively executed (i.e., maintenance based on a manual operation is allowed).

On the other hand, if the CPU 51 determines in S180 that the exception conditions described above have not been met (S180: NO), in S190 the CPU 51 determines whether ink cartridges 32 mounted in the cartridge holder 35 have been removed. The CPU 51 performs this determination according to the same method described in S110.

If the ink cartridges 32 remain mounted in the printer 1 (S190: NO), the CPU 51 returns to S140 described above. However, if the ink cartridges 32 have been removed (S190: YES), the CPU 51 returns to S110 described above. Thereafter, if the CPU 51 determines that ink cartridges 32 have been newly mounted in the cartridge holder 35 (S110: YES), in S120 the CPU 51 sets the value of the subscription flag F to 0. Thus, after ink cartridges 32 for a subscription business have been removed while F=1 and the operating mode is the second operating mode, the CPU 51 switches the operating mode from the second operating mode to the first operating mode when ink cartridges 32 for a retail business are newly mounted.

Effects of the Embodiment

As described above, the printer 1 according to the present embodiment executes the process to switch operating modes in order to support both retail and subscription-based business models. In a state where the subscription flag F is set to 0 and the operating mode of the printer 1 is the first operating mode in which the manual maintenance mode and automated maintenance mode are selectively executed, the operating mode of the printer 1 is switched to the second operating mode in response to acquiring prescribed control information. In the example described above, the control information is type information acquired from the cartridge memories 65 of the ink cartridges 32 via the communication interface 85. The type information indicates whether the ink cartridges 32 are retail or subscription-based cartridges. In the second operating mode, the automated maintenance mode is executed without executing the manual maintenance mode.

Through this process, the operating mode of the printer 1 is set to the second operating mode described above when the printer 1 is used in a subscription business model, for example. In the second operating mode, the control mode is always set to the automated maintenance mode. In other words, the second operating mode prevents the maintenance functions according to the manual maintenance mode from being implemented. Accordingly, the present embodiment avoids the above-mentioned disadvantages to the service provider that may occur when the user executes manual maintenance under a subscription-based format, thereby improving convenience for the service provider.

Further, by leaving the operating mode of the printer 1 in the first operating mode described above when the printer 1 is used in a retail business model, the automated maintenance mode and manual maintenance mode can be executed as appropriate with no particular restrictions. This configuration enables the user to perform manual maintenance at desired timings when the user wishes to execute manual maintenance and to utilize the automated maintenance mode when the user wishes to have maintenance executed automatically based on the prescribed maintenance conditions. Accordingly, this arrangement can ensure convenience for the user.

As described above, the printer 1 according to the present embodiment can ensure convenience for both the user and the service provider by modifying control according to the business model in use.

Further, in the present embodiment, the CPU 51 executes the process in S130 to acquire type information in order to support both retail and subscription-based business models. In S130 the CPU 51 acquires type information for the ink cartridges 32 mounted in the cartridge holder 35 as the control information. If the acquired type information is a predetermined type, i.e., the subscription type in this example, in S170 the CPU 51 switches the operating mode from the first operating mode to the second operating mode, thereby setting the control mode exclusively to the automated maintenance mode at all times.

In this way, the control mode is always set to the automated maintenance mode when the type of the mounted ink cartridges 32 corresponds to subscription-based cartridges. In other words, the second operating mode prevents maintenance functions according to the manual maintenance mode from being implemented. Accordingly, the present embodiment reliably avoids the above-mentioned disadvantages to the service provider that may occur when the user executes manual maintenance under a subscription business model.

If the type of ink cartridges 32 mounted in the printer 1 corresponds to retail cartridges, in S150 the CPU 51 maintains the operating mode of the printer 1 in the first operating mode, enabling the control mode to be set to the automated maintenance mode and manual maintenance mode as appropriate with no particular restrictions. This configuration enables the user to perform maintenance at desired timings when the user wishes to execute manual maintenance and to utilize the automated maintenance mode when the user wishes to have maintenance executed automatically based on the prescribed maintenance conditions.

When subscription-based ink cartridges 32 are mounted in the printer 1 in the present embodiment, the CPU 51 determines that the type information acquired in S130 indicates subscription-based cartridges and switches the operating mode to the second operating mode. Thus, when subscription-based ink cartridges 32 are mounted in the printer 1, the printer 1 can reliably prevent maintenance functions according to the manual maintenance mode from being implemented.

Further, in the present embodiment, the communication interface 85 is configured to communicate with retail or subscription-based ink cartridges 32. The cartridge memories 65 on retail ink cartridges 32 store type information indicating a retail cartridge while cartridge memories 65 on subscription-based ink cartridges 32 store type information indicating a subscription-based cartridge. When retail ink cartridges 32 or subscription-based ink cartridges 32 are mounted in the cartridge holder 35, the corresponding type information is read from each cartridge memory 65 and transmitted to the communication interface 85 through communications. Thus, in S130 the communication interface 85 acquires the transmitted type information. In this way, the printer 1 of the present embodiment acquires type information automatically from ink cartridges 32 when the ink cartridges 32 are mounted in the cartridge holder 35, thereby easily managing the types of ink cartridges 32.

In the present embodiment, contract details indicating an agreement made between the user and service provider with respect to a subscription business are stored in the EEPROM 54. Hence, when subscription-based ink cartridges 32 are mounted in the cartridge holder 35 and the CPU 51 determines in S140 that the type of mounted cartridges is subscription-based cartridges, in S160 the CPU 51 determines whether contract information for the subscription-based ink cartridges 32 is stored in the EEPROM 54. The CPU 51 only switches the operating mode from the first operating mode to the second operating mode when contract information for the subscription-based ink cartridges 32 mounted in the cartridge holder 35 is stored in the EEPROM 54.

Thus, in addition to the primary determination in S140 regarding whether the mounted ink cartridges 32 are subscription-based ink cartridges 32, the CPU 51 performs a secondary determination in S160 to determine whether an agreement has been entered for the ink cartridges 32. The CPU 51 only switches the control mode to the automated maintenance mode when both determinations are positive. Thus, if the user mistakenly uses subscription-based ink cartridges 32 despite the fact that an agreement has not been entered for a subscription business, the printer 1 of the present embodiment can prevent maintenance operations according to the manual maintenance mode from being disallowed.

In the automated maintenance mode of the present embodiment, occurrences of ink ejection failures in the inkjet head 3 are detected at prescribed time intervals and a maintenance is executed in S40 only when an ejection failure is detected. In this way, maintenance is not performed in the automated maintenance mode when no particular ejection failures have occurred. This configuration can prevent the needless consumption of ink caused by unnecessary maintenance operations.

As described above, when subscription-based ink cartridges 32 are mounted in the printer 1 and control is performed according to the automated maintenance mode, there may be some cases in which it is preferable to allow exceptions to execute maintenance according to manual operations. Reasons for allowing such exceptions include emergencies that occur outside of the business hours of the service provider. Therefore, when one of the prescribed exception conditions (i), (ii), and (iii) or the like is satisfied in S180 of the present embodiment, the CPU 51 switches to the third operating mode for allowing maintenance based on manual operations. This configuration can further enhance convenience for the user and service provider.

Further, when subscription-based ink cartridges 32 are mounted in the printer 1 and the printer 1 is executing the automated maintenance mode, the user may remove the subscription-based ink cartridges 32 and replace them with retail ink cartridges 32 due to the user's circumstances. In such a case, the CPU 51 in the present embodiment acquires type information for the newly mounted retail ink cartridges 32 in S130 and, after determining their type based on the type information in S140, changes in S150 the operating mode from the second operating mode to the first operating mode. Thus, the printer 1 according to the embodiment can perform suitable control, even when the mounted subscription-based ink cartridges 32 are replaced with retail ink cartridges 32, thereby further enhancing convenience for the user and service provider.

Variations of the Embodiment

While the specific embodiment of the present disclosure has been described in detail, it would be apparent to those skilled in the art that many modifications and variations may be made thereto. Next, a series of variations of the embodiment will be described, wherein like parts and components with the above-described embodiment are designated with the same reference numerals to avoid duplicating description.

(1) Control Based on Details of the Subscription-Based Ink Cartridges

Figure 4:
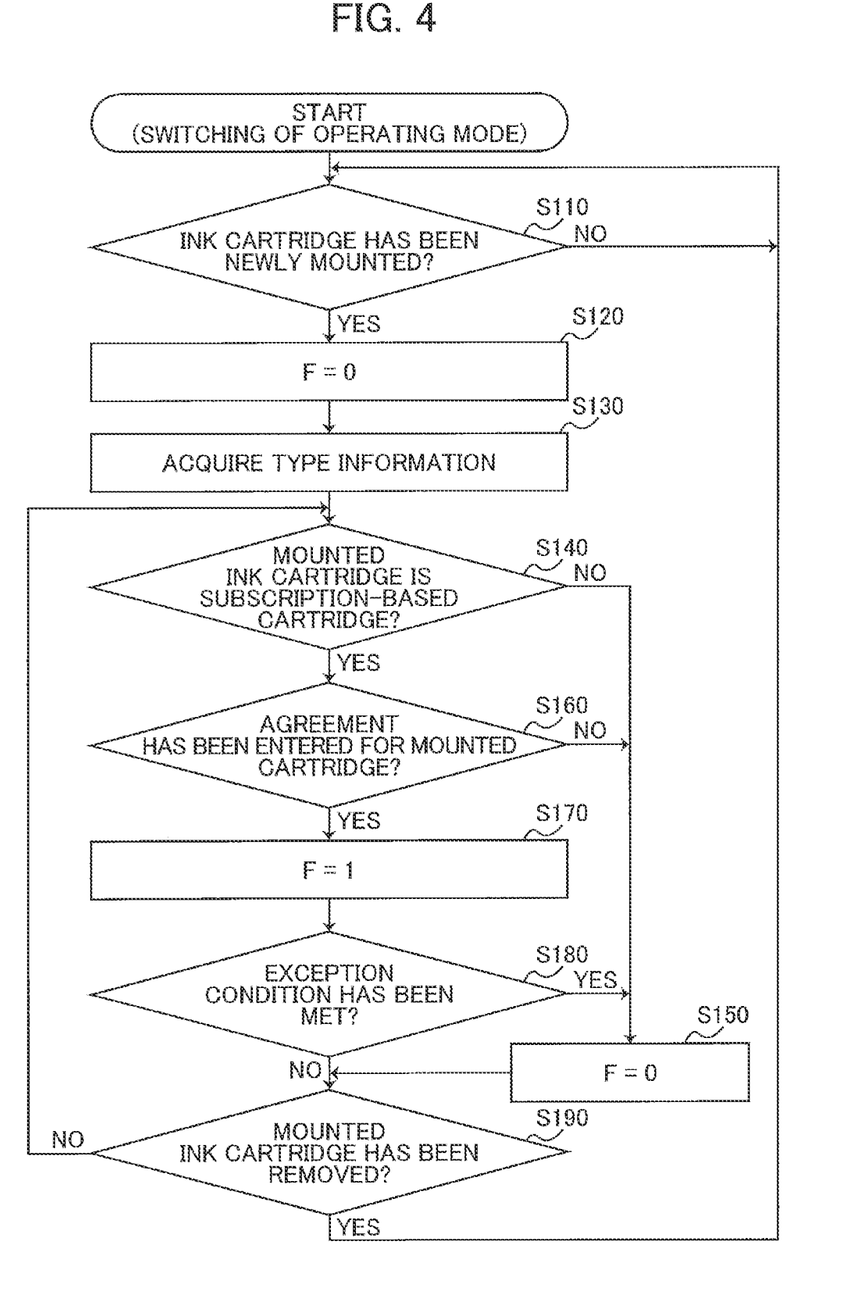
FIG. 4 is a flowchart indicating a process performed by the CPU to switch an operating mode of the printer.

When the CPU 51 acquires type information in S130 of FIG. 4 and determines that subscription-based ink cartridges 32 are mounted in the printer 1, the CPU 51 may modify the method used in S20 of FIG. 3 for detecting ejection failures based on further details regarding the type of cartridge. For example, the following three methods are conceivable.

(a) Ink Droplet Size Control

While the defective nozzle detection portion 84 detects charged ink droplets in the embodiment described above in order to identify ejection failures, the printer 1 may modify the size of these ink droplets based on the type of ink cartridges 32.

That is, in the normal state of the actuator 14 described above, a prescribed positive potential is applied to the electrodes causing the electrodes to curve toward the pressure chamber that stores ink. In this state, by switching the electrodes to ground potential at an appropriate timing, the volume of the pressure chamber expands, producing a pressure wave. Then, by setting the electrodes to the prescribed positive potential once again at the timing at which the pressure wave becomes positive pressure, the ink in the pressure chamber is applied with pressure, thereby ejecting ink droplets from the nozzles 10. In this variation, by virtue of this method known as pull ejection, good ink ejection speed can be obtained with a relatively small drive voltage. A plurality of patterns of drive pulse signals to be applied to electrodes at this time is prepared in advance and stored in a pulse waveform data storage unit (not shown) provided in the controller 50. Each pattern of drive pulse signals is configured of pulses having high levels and low levels and differ from each other by their high-level periods and low-level periods.

In subscription-based ink cartridges 32, ink in the ink cartridges 32 is projected to have a lower degree of thickening when the user has entered a contract for printing a relatively large number of pages within a fixed time interval, for example. Conversely, ink in the ink cartridges 32 is projected to have a higher degree of thickening at when the user has entered a contract for printing a relatively small number of pages within the fixed time interval. Since the size of the ink droplet actually ejected can vary according to the degree of ink thickening when using the same drive pulse signal, the printer 1 according to this variation reads, from the pulse waveform data storage unit, different drive pulse signals (i.e., different patterns of the drive pulse signals) based on whether the projected degree of thickness is high or low and uses the read drive pulse signals (i.e., the read pattern of the drive pulse signals). Thus, this variation is configured to achieve approximately the same ink droplet ejection behavior no matter what type of subscription-based ink cartridges 32 are being used and can therefore maintain high precision in detecting ejection failures.

(b) Variable Threshold Control

For detecting ejection failures in the present embodiment described above, the defective nozzle detection portion 84 detects signals indicating changes in electric current produced when a charged ink droplet lands on the absorbent material and determines that an ejection failure occurred for the nozzle 10 when the signal value is less than or equal to a prescribed threshold. Since the size of the ink droplet actually ejected varies according to the degree of ink thickening when using the same drive pulse signals (i.e., the same pattern of the drive pulse signals), as described above, the printer 1 may compensate for such variations in ink droplet size by varying the magnitude of the threshold value according to the type of ink cartridges 32. Thus, this variation can maintain high precision in detecting ejection failures no matter what type of subscription-based ink cartridges 32 is used.

(c) Scanning Sensitivity Adjustments for Test Patterns

When a CCD, photosensor, or the like is used to scan a printed test pattern in order to detect ejection failures, as in the method described above, the scanning sensitivity may be adjusted. That is, since the size of the ink droplet actually ejected varies according to the degree of ink thickening when using the same drive pulse signals (i.e., the same pattern of the drive pulse signals), as described above, the scanning sensitivity is increased when the projected ink thickening is high and decreased when the projected ink thickening is low. Thus, this variation can maintain high precision in detecting ejection failures no matter what type of subscription-based ink cartridges 32 is being used.

The above variations describe examples of modifying the method for detecting ejection failures executed in S20 of FIG. 3 based on the detailed type of the subscription-based ink cartridges 32 and the like, but the present disclosure is not limited to these configurations. Specifically, when conducting maintenance in S40 according to the automated maintenance mode, the printer 1 may modify the method of maintenance according to one of the methods (a)-(c) described above depending on what type of subscription-based ink cartridges 32 is being used.

(2) Operations of the Service Provider to Switch Operating Modes

In the present embodiment, the operating mode of the printer 1 is switched between the first operating mode and the second operating mode based on whether retail or subscription-based ink cartridges 32 are mounted in the cartridge holder 35. Alternatively, in this variation, the operating mode is switched in response to a prescribed operation that the service provider performs at a suitable timing.

<Control Process>

Here, a control process executed by the CPU 51 according to the present variation in order to switch the operating mode will be described with reference to the flowchart in FIG. 5 that corresponds to the flowchart of FIG. 4. As described above, this control process is implemented by the CPU 51 executing a switching process program included in the plurality of programs stored in the ROM 52. Execution of this control process implements the following switching method according to this variation.

Figure 5:
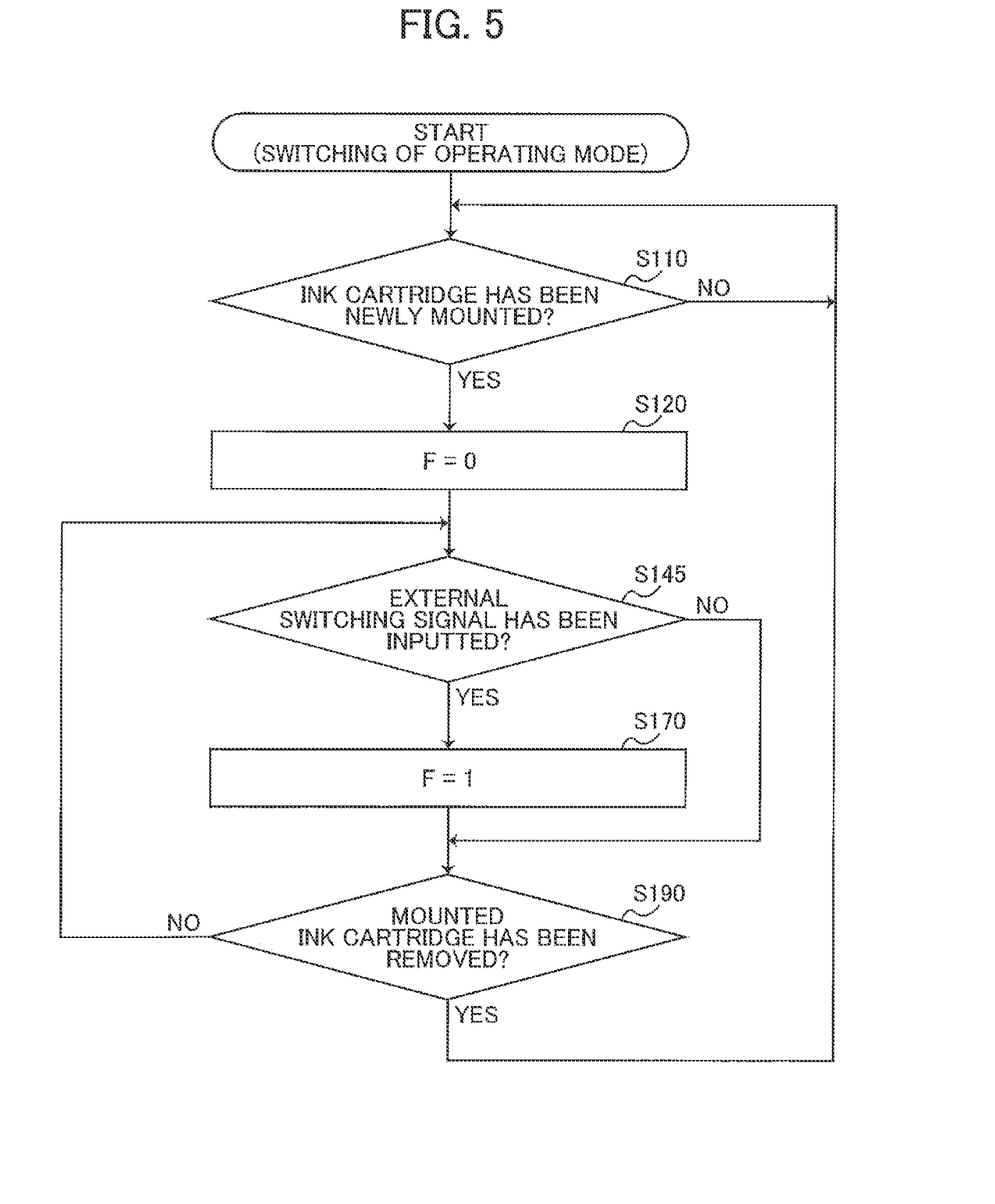
FIG. 5 is a flowchart indicating a process performed by a CPU of a printer according to a variation of the embodiment to switch an operating mode of the printer.

The control process shown in FIG. 5 differs from that in the above-described embodiment in that steps S130, S150, S160, and S180 in the flowchart of FIG. 4 are eliminated and step S145 is provided in place of step S140 in FIG. 4.

As in the process of FIG. 4, in S110 of FIG. 5 the CPU 51 determines whether ink cartridges 32 have been newly mounted in the cartridge holder 35 and advances to S120 when true (S110: YES). In S120 the CPU 51 sets the subscription flag F to 0. As described with reference to FIG. 4, setting the subscription flag F to 0 places the operating mode of the printer 1 in the first operating mode in which the printer 1 selectively executes the manual maintenance mode and automated maintenance mode.

Thereafter, in S145 the CPU 51 determines whether an external switching signal for switching the operating mode has been inputted based on a manual operation by the service provider. The service provider may input this external switching signal the CPU 51 through the above-described dedicated interface via a network. Alternatively, the service provider may input the external switching signal into the CPU 51 by performing a manual operation directly on the printer 1. This manual operation on the printer 1 may be the execution of suitable key operations or the input of a hidden code, for example. If the CPU 51 determines that an external switching signal has been inputted (S145: YES), in S170 the CPU 51 changes the value of the subscription flag F from 0 to 1 to switch the operating mode from the first operating mode to the second operating mode, as described in the flowchart of FIG. 4. Subsequently, the CPU 51 advances to S190 as in FIG. 4. If the CPU 51 determines in S145 that an external switching signal has not been inputted (S145: NO), the CPU 51 advances directly to S190. The external switching signal is an example of the control information.

In S190 the CPU 51 determines whether the ink cartridges 32 have been removed, as in the process of FIG. 4. The CPU 51 returns to S145 if the ink cartridges 32 have not been removed (S190: NO) and returns to S110 when the ink cartridges 32 have been removed (S190: YES).

Effects of the Variation

The variation described above can obtain the same effects described in the above-described embodiment. That is, in a case where the printer 1 is used in a subscription business, the service provider sets the operating mode of the printer 1 to the second operating mode by inputting an external switching signal into the CPU 51 through the manual operation described above. By this operation, the control mode is always set to the automated maintenance mode. In other words, this operation prevents maintenance functions according to the manual maintenance mode from being implemented. Accordingly, this variation can avoid the above-mentioned disadvantages to the service provider that may occur when the user executes manual maintenance under a subscription business model, thereby improving convenience for the service provider.

Further, in a case where the printer 1 is used under retail business, the service provider does not input an external switching signal into the CPU 51 without performing the manual operation described above, and, thus, the operating mode of the printer 1 is left in the first operating mode. Accordingly, the automated maintenance mode and manual maintenance mode can be executed as appropriate, with no particular restrictions. This configuration enables the user to perform maintenance at desired timings when the user wishes to execute manual maintenance and to utilize the automated maintenance mode when the user wishes to have maintenance executed automatically based on prescribed maintenance conditions. Accordingly, this arrangement can ensure convenience for the user.

As described above, the present variation can ensure convenience for both the user and the service provider by performing control according to the business model in use.

(3) Other Variations

Further, the flowcharts shown in FIGS. 3, 4, and 5 do not limit the present disclosure to the steps indicated therein. Steps may be added or deleted, or their order may be rearranged.

In addition to what has already been described, the methods according to the embodiment and its variations described above may be used in suitable combinations.

In addition, although not illustrated individually, the present disclosure may be implemented with various modifications.

What is claimed is:

1. A printing device comprising:
a printing portion comprising an ejection head configured to eject ink, the printing portion being configured to print on a printing medium using ink;
a maintenance portion configured to perform maintenance on the ejection head, the maintenance involving consumption of ink; and
a controller provided with, as a control mode for controlling the maintenance portion:
a manual maintenance mode in which, in response to acquiring a maintenance command signal based on a manual operation, the controller executes the maintenance by controlling the maintenance portion; and
an automated maintenance mode in which, in response to a prescribed maintenance execution condition being met, the controller automatically executes the maintenance by controlling the maintenance portion,
the controller being configured to perform:
(a) switching, on the basis of control information acquired by the controller, an operating mode of the printing device from a first operating mode in which the controller selectively executes the manual maintenance mode and the automated maintenance mode to a second operating mode in which the controller executes the automated maintenance mode without executing the manual maintenance mode.

2. The printing device according to claim 1,
wherein the control information includes an external switching signal, and
wherein the switching in (a) is performed when the external switching signal is inputted into the controller.

3. The printing device according to claim 1,
wherein ink is supplied from an accommodation body to the ejection head and the control information includes type information of the accommodation body,
wherein the controller is configured to further perform:
(b) acquiring the type information of the accommodation body, and
wherein the switching in (a) is performed when the type information acquired in (b) indicates a predetermined specific type.

4. The printing device according to claim 1,
wherein the controller is configured to further perform:
(c) detecting, at prescribed time intervals, whether the ejection head has an ink ejection failure, and
wherein, in the automated maintenance mode, the controller executes the maintenance by controlling the maintenance portion in response to detecting in (c) that the ejection head has an ink ejection failure.

5. The printing device according to claim 3,
wherein the controller is configured to further perform, when the type information acquired in (b) indicates the predetermined specific type:
(d) changing a maintenance method used in the maintenance executed under the automated maintenance mode.

6. The printing device according to claim 1,
wherein the controller is configured to further perform:
(e) switching, in response to a prescribed exception condition being met in a state where the operating mode is set to the second operating mode, the operating mode of the printing device from the second operating mode to a third operating mode in which the maintenance based on the manual operation is allowed.

7. A printing device comprising:
a printing portion comprising an ejection head configured to eject ink, the printing portion being configured to print on a printing medium using ink;
a maintenance portion configured to perform maintenance on the ejection head, the maintenance involving consumption of ink; and
a controller provided with, as a control mode for controlling the maintenance portion:
a manual maintenance mode in which, in response to acquiring a maintenance command signal based on a manual operation, the controller executes the maintenance by controlling the maintenance portion; and
an automated maintenance mode in which, in response to a prescribed maintenance execution condition being met, the controller automatically executes the maintenance by controlling the maintenance portion,
the controller being configured to perform:
a first operating mode in which the controller selectively executes the manual maintenance mode and the automated maintenance mode when the printing device has prescribed contract information; and
a second operating mode in which the controller executes the automated maintenance mode without executing the manual maintenance mode when the printing device does not have the prescribed contract information.

8. The printing device according to claim 7,
wherein the controller is configured to further perform:
detecting, at prescribed time intervals, whether the ejection head has an ink ejection failure, and
wherein, in the automated maintenance mode, the controller executes the maintenance by controlling the maintenance portion in response to detecting that the ejection head has an ink ejection failure.

* * * * *